Patented Mar. 16, 1948

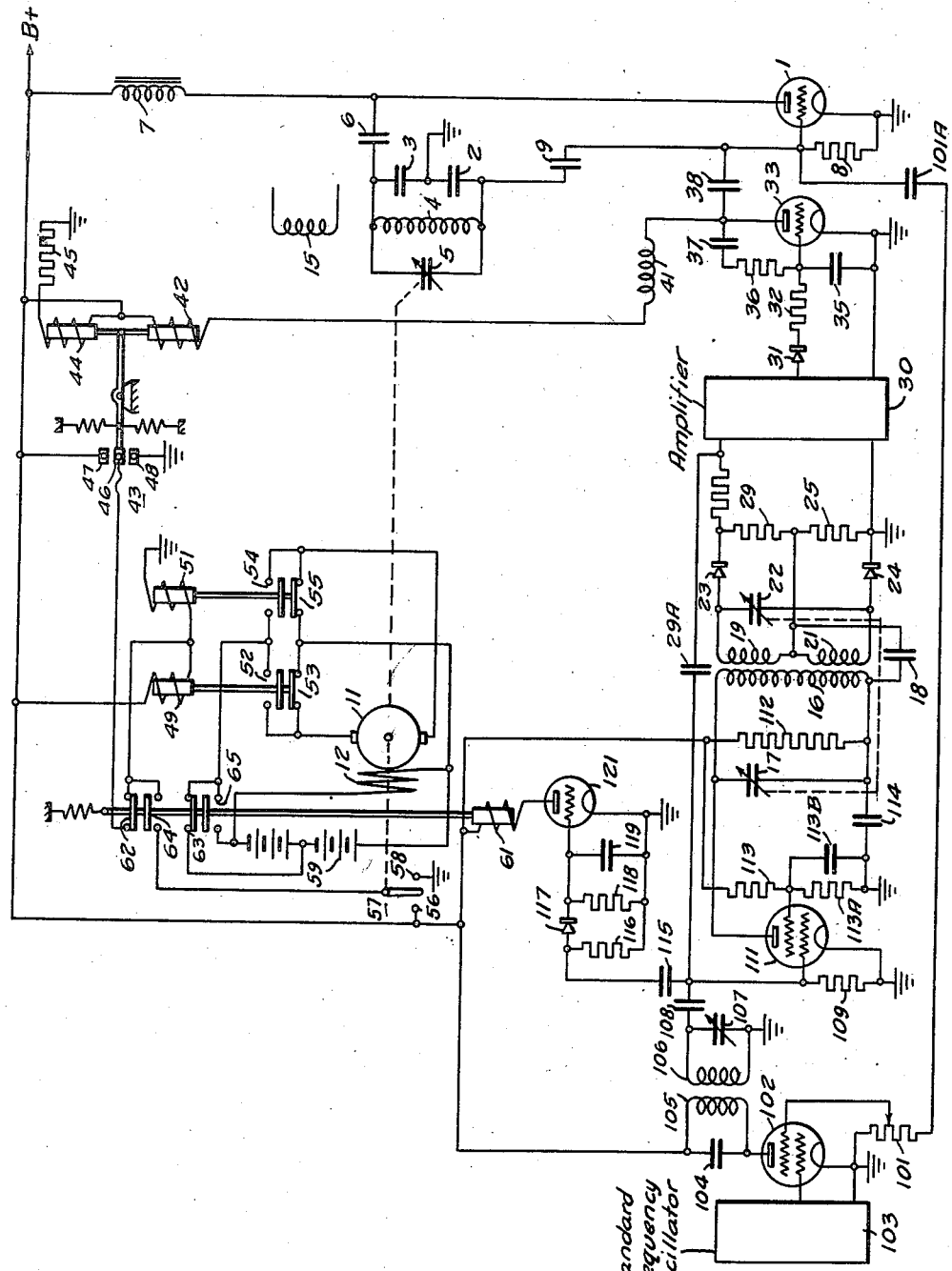

2,438,009

UNITED STATES PATENT OFFICE 2,438,009

CONTROL SYSTEM

Theodore P. Kinn and David R. Tashjian, Baltimore, Md., assignors to Westinghouse Electric Corporation, East Pittsburgh, Pa., a corporation of Pennsylvania Application March 17, 1945, Serial No. 583,293

2 Claims. (Cl. 250—36)

Our invention relates to arrangements for tuning resonant circuits, such, for example, as those of oscillation generators, and in particular relates to electrically operated arrangements for adjusting and maintaining the frequency of such circuits at a predetermined desired value. An arrangement for a somewhat similar purpose is shown in our application for Electric circuit regulator Serial No. 583,292, filed March 17, 1945, Patent No. 2,436,307, dated February 17, 1948.

For many purposes, particularly in the radio art, it is desirable to maintain the frequency of circuits, such, for example, as the output of an oscillation generator, at a constant value throughout an extended period of time notwithstanding variations of power, operating or environment temperature, and other causes which have a tendency to cause the frequency of nonregulated resonant circuits to vary from time to time. It is also desirable to be able to adjust at will the predetermined value of frequency which is to be maintained constant. Where large power outputs are dealt with, the capacitors and inductances which determine the frequency of resonance of the circuit are of large size, and, while arrangements are known for stabilizing the frequency of resonant circuits against their tendency to vary, such arrangements become extremely expensive and cumbersome when they are applied directly to the large size capacitors and inductances involved in high power circuits. Likewise, it is usually desirable to employ large amounts of power for output apparatus such as antennas which are likely to be located in places where they are necessarily distant from the supervising operators of the equipment. If the capacitors and inductances of the resonant circuits have to be manually adjusted by the supervising operator, it is necessary to transmit the power circulating through these capacitors and inductances through relatively long transmission lines to reach the antennas and other output apparatus just mentioned.

In accordance with our invention, we have devised arrangements by which the settings of the large-size capacitors and inductances may be remotely controlled from resonant circuits of small power. The arrangements are such that the electrical apparatus automatically adjusts the distant large-size capacitors or inductances whenever the frequency of the current in the latter deviates for any reason from the resonant frequency to which the small-sized control-resonators are adjusted. Because of the small size of the control-resonators, they show little tendency to vary in resonant frequency, and insofar as they do, it is comparatively easy and inexpensive to stabilize their frequency by methods well known in the radio art. Also in the generation of large amounts of power, it is customary to employ several stages of amplification, each of which has to be separately tuned. By means of the arrangements of this invention the intermediate stages of amplification are eliminated permitting tuning control of a high power generating circuit with a minimum number of controls.

Since the small-size control resonators may be separated by electrical lines of relatively small capacity from the distant large-size tuning elements which they control, it is possible to locate the latter and all the equipment such as high-power generators involved in the high-power circuits close to the output elements such as antennas retaining only the small-sized control elements at the stations to be occupied by the supervising operators. This possibility presents a tremendous advantage in certain fields of radio operation.

One object of our invention is accordingly to provide arrangements for adjusting tuning elements of electric circuits by electrical control to maintain resonance with control-resonators.

Another object of our invention is to provide an arrangement for adjusting tuning elements of an electric circuit by a remote control system so that they maintain resonant adjustment which coincides with that of control resonators positioned at a substantial distance from them.

Another object of our invention is to provide an arrangement by which tuning elements of an electric circuit may be moved to follow changes of adjustment in control resonators to which they are linked only by electrical control circuits.

Still another object of our invention is to increase the efficiency of operation, or decrease the initial expense of radio installations of substantial power by making it possible to locate the high-power elements of the installation at a distance from the supervising operator.

Still another object of our invention is to maintain a tuned circuit resonant at a frequency differing by a predetermined amount from that of standard frequency generator which may be of small capacity compared to the power flowing in said tuned circuit and be maintained constant in frequency readily and economically.

Other objects of our invention will become apparent upon reading the following description taken in connection with the drawing, in which:

The single figure is a schematic diagram of a control circuit which operates to maintain the frequency of an oscillation generator in resonance with the setting of a resonant control circuit whatever may be the adjustment of the latter.

Referring in detail to the drawing, 1 is a standard oscillation generator which may be of any type employing a resonant control circuit, but which for purposes of illustration is shown as a three-element electron tube connected up in the well known Colpitts oscillator circuit. In accordance with the Colpitts circuit, the cathode of the tube 1 is connected to the common terminal of a pair of capacitors 2, 3 of which the outside terminals are connected across a resonant tank circuit comprising an inductor 4 and a variable capacitor 5. A load circuit 15 is inductively coupled to inductor 4. The anode of the tube 1 is connected through a capacitor 6 to one terminal of the inductor 4 and is likewise connected through an inductance 7 to the positive terminal B+ of a source of direct-current voltage having its negative terminal grounded. The control electrode of the tube 1 is connected through a resistor 8 to its cathode and through a capacitor 9 to the other terminal of the inductor 4. The inductor 4 and capacitor 5 constitute the frequency-setting tank circuit for the oscillator 1, and the capacitor 5 is connected by a suitable mechanism to the shaft of a motor having an armature 11 and a field winding 12 which is relay-operated to maintain the desired adjustment for resonance of the tank circuit 4, 5. The grid of tube 1 is connected through a capacitor 101A and resistor 101 to the grounded cathode of a mixer tube 102, and a second control electrode in this tube is connected to a variable tap on the resistor 101. A standard frequency oscillator 103 which may be of low power is connected between a second grid of tube 102 and ground. It will be evident that the standard oscillator 103 impresses its own frequency on the grid to which it is connected; the resistor 101 impresses the frequency of the oscillator 1 on the grid to which it is connected, and that the tube 102 therefore acts as a mixer tube producing in its output circuit the beat frequencies of a standard oscillator 103 and a power oscillator 1. A capacitor 104 and inductance 105 in the ouput circuit of tube 102 are adjusted to the value desired for this beat frequency. A secondary winding 106 shunted by a variable capacitor 107 is used to impress through a coupling capacitor 108 and resistor 109 this beat frequency on the control electrode of an electron tube 111. The cathode of the tube 11 is grounded and its anode is connected through a winding 16 and a resistor 112 to the positive terminal of a voltage source B of which the negative terminal is grounded. A second control electrode in tube 111 is connected to the common junction of a pair of resistors 113 and 113A connected in series across the source having the positive terminal B+, the resistor 113A being shunted by a capacitor 113B. The tube 111 acts as a limiter for voltages transmitted between its input and output circuits.

The common junction of the resistor 112 and the winding 16 are connected to ground through a capacitor 114 and the winding 16 is shunted by a variable capacitor 17 and having one terminal connected through a capacitor 18 to a common terminal of a pair of substantially equal windings 19, 21, each of which is loosely coupled to the winding 16. The outside terminals of the windings 19, 21 are shunted by a variable capacitor 22 which is preferably connected to move in unison with the capacitor 17 and to resonate the windings 19, 21 to the same frequency as the capacitor 17 resonates with the winding 16. A pair of rectifiers 23, 24 are likewise connected between the respective outside terminals of the windings 19, 21 and a resistor 25 which has its mid-point connected to the common junction of windings 19 and 21. One terminal of the resistor 25 is connected to ground while the other terminal is connected through a resistor 29 to the input circuit of a conventional alternating-current amplifier 30. The same input terminal is connected through capacitor 29A to the ungrounded end of resistor 109. Those skilled in the art will recognize the network 16 through 25 as a Seeley discriminator in which the voltage between the outside terminals of the resistor 25 will be zero when the frequency of the current flowing in the limiter 111 is that to which the inductances 19, 21 and capacitor 22 are resonant, and in which a voltage of one polarity will exist across the outside terminals of the resistor 25 when the frequency of the current in the limiter 111 is less than the resonant frequency of the elements 19, 21, 22 and is of the opposite polarity when the frequency of the current in the limiter 111 is greater than the resonant frequency of the elements 19, 21, 22. While we have chosen to illustrate our invention by employing a discriminator of the Seeley type, it will be evident to those skilled in the art that this is merely representative of discriminators generally, which have the property of producing a direct-current voltage across their output terminals which is of one polarity when their input frequency is less than that for which their resonant elements are tuned, and of the opposite polarity when their input frequency is greater than that for which their resonant elements are tuned.

The amplifier 30 has impressed on its input circuit from resistor 109 an alternating voltage which may be of the same frequency as that derived from the mixer tube 102 and be a portion thereof as shown. Alternatively however it may use an entirely separate source of alternating current of any suitable frequency. By means of the control effect of the discriminator output the amplified value of this alternating current is caused to vary, and after rectification by rectifier 31 and resistor 32, it becomes a greatly amplified unidirectional voltage proportional to the discriminator output. This unidirectional voltage is impressed upon the control electrode of an electron tube 33 which is what is known in the art as a "reactance tube"; that is to say, it is a tube which draws a current 90° out of phase with the voltage across its terminals, and hence behaves like a reactance in an alternating-current circuit. This tube has the further property that the amount of current flowing through it increases when the direct-current voltage impressed on its control electrode increases, and vice versa; in other words, it functions as a reactance, the magnitude of which varies with the direct-current voltage impressed on its control electrode by the amplifier 30 through rectifier 31.

While we have described the amplifier 30 as a conventional alternating-current amplifier, it will be possible to substitute for it a conventional direct-current amplifier, but we prefer to employ an alternating-current amplifier because of the difficulty such as poor stabilization which characterizes present direct-current amplifiers.

The tube 33 is connected to act as a reactance tube by connecting a capacitor 35 between its control electrode and cathode and a resistor 36 in series with a blocking condenser 37 between its control electrode and its anode. However, other reactance tube circuits are known and we do not wish to limit our invention to the one just described.

The anode of the tube 33 is connected through a capacitor 38 to the control electrode of the oscillation generator 1. As a result, the reactance tube 33 is, in effect, connected to add its reactance to the tank circuits 4, 5 and to vary the resonating frequency of the generator 1 up or down in correspondence with the changes in the current between the anode and cathode of tube 33.

A moment's consideration will show that when the frequency at which the tube 1 beats with oscillator 103 corresponds with the resonant frequency of the elements 16, 17 of the discriminator, the voltage of that discriminator will impress zero direct-current voltage on the amplifier 30. The output voltage of the amplifier 30 acting through the rectifier 31 will then be producing a current between the anode and cathode of the reactance tube 33 which will cause the latter to play a part, with the inductor 4 and the capacitor 5, in tuning the oscillation generator 1 to this resonant frequency. If, now, for any reason such as a variation with load on the winding 15 the frequency of the oscillator 1 decreases, the current in the tube 111 will no longer correspond in frequency to resonance for the inductances 19, 21 and capacitor 22 of the discriminator, and a direct-current voltage will be impressed by the output terminals of the discriminator of the amplifier 30. This will change the value of the direct-current voltage impressed on the amplifier 30 and hence change the unidirectional voltage acting on the reactance tube 33 and vary the value of its plate current to change the effective reactance which it impresses on the resonant circuits 4, 5. By proper choice of polarity of the discriminator 16—28 the alteration of the equivalent reactance of the tube 33 may be made such as to increase the resonant frequency of the tank circuits 4, 5. This increased frequency will continue to produce a voltage on the output of the discriminator 16—25 and to alter the plate-to-cathode current of reactance tube 33 until the beat frequency in tube 111 comes back to coincidence with the resonant frequency of the discriminator circuit 19, 21, 22.

Not only will the alternating current drawn by the reactance tube 33 vary when the direct-current voltage impressed from amplifier 30 on its control electrode changes, but also the amount of direct current which its plate circuit draws from the direct-current supply will likewise change. The connection from the plate of the tube 33 to the direct-current supply is through an inductor 41 and through one winding 42 of a balanced relay 43, the other winding 44 of which is fed from some direct-current source such as B through a resistor 45. The windings 42 and 44 are so proportioned that when the discriminator 16—25 impresses zero voltage on amplifier 30, the windings 42 and 44 exert equal and opposite pulls on a movable contact 46 of the relay 43. When the net force on the movable contact 46 is zero, it stands in an intermediate position between a pair of co-operating contacts 47 and 48 of the relay 43. The contact 47 is connected to the positive terminal of the direct-current source B and the contact 48 is connected through ground to the negative terminal of that source. The contact 47 and the contact 48 are respectively connected to the opposite terminals of a pair of serially connected relay windings 49 and 51. The winding 49 is positioned to actuate a pair of contacts 52 from open to closed position, and a pair of contacts 53 from closed to open position, when winding 49 is energized. The winding 51 is similarly positioned so that when energized it moves a pair of contacts 54 from open to closed position and a pair of contacts 55 from closed to open position. The contact 47 is likewise connected to one terminal 56 of a limit switch 57, the other terminal 58 of which is connected through ground to the contact 48. The adjacent contacts of contact-pairs 52, 53 are connected together to one brush and the adjacent contacts of pairs 54, 55 are connected together to the other brush of the motor armature 11. The remaining terminals of the contacts 53 and 55 are connected together to one side of the field winding 12 which is energized from a direct-current source 59.

The control electrode of limiter 111 and ungrounded end of resistor 109 is connected to ground through a capacitor 115 and a resistor 116. A rectifier 117 connects the ungrounded terminal of resistor 116, through a resistor 118 shunted by a capacitor 119, to the grounded cathode of an electron tube 121. The control electrode of tube 121 is connected to the ungrounded end of resistor 118, while its anode is connected through the energizing coil 61 of a relay to the positive terminal of voltage source B. This relay, which may be termed a "search relay" moves two pairs of normally closed contacts 62, 63 from closed to open position, and moves two pairs of normally open contacts 64, 65 from open to closed position when a sufficiently large current flows through coil 61. Homologous contacts of the contact pairs 62, 64 are connected to the common terminal of the windings 49, 51 and homologous contacts of the pairs 63, 64 are connected to the remaining contacts of the pairs 52, 54 previously mentioned. The remaining contact from the pair 62 is connected to the contact 46, the remaining contact from the pair 63 is connected to the midpoint of the voltage source 59, the remaining contact from the pair 64 is connected to the movable blade of the limit switch 57, and the remaining contact of the pair 65 is connected to the opposite end of voltage source 59 from contact 55. It will be noted that with the above-described connections the brushes of armature 11 are short-circuited when windings 49 and 51 are both deenergized, and also when they are both energized.

The limit switch 57 is mechanically attached to the movable element of the capacitor 5 so that it is pushed into contact with the contact 56 when the capacitor 5 is moved to one of its extreme positions, and thereafter remains in contact with terminal 56 until the capacitor 5 is moved to its other extreme position, at which time the movable blade of the switch 57 is moved out of contact with terminal 56 and into contact with terminal 58.

The mode of operation of the foregoing relay system will now be described. We will consider first the conditions existing when the beat frequency of standard oscillator 103 and oscillator 1 is not far different from that to which the elements 19, 21, 22 of the discriminator are tuned. Under such conditions no substantial current will flow through the winding 61 and the contacts 62, 63, 64 and 65 will be in the position shown in the drawing. With the contacts 64 thus open, the movable member of the limit switch 57 is disconnected from circuit and the position of that limit switch plays no part in the operation of the relay system. On the other hand, closure of the contacts 63 will connect the upper contacts of the relays 52 and 54 to the mid-point of the voltage source 59. However, this will not, in itself, energize the motor 11, 12 because, until one of the windings 49 or 51 is energized and the other deenergized, the brushes of the armature 11 are short-circuited through either the contacts 53, 55 or the contacts 52, 54.

Considering, then, the situation existing when current through winding 61 is near zero, the contact 62 is as just stated, closed, and it connects both windings 49 and 51 to the movable contact 46 of relay 43. As long as the movable contact 46 of relay 43 remains in its mid-position, it will impress no voltage on winding 49 or 51, but current will flow in series from the positive terminal B+ of the voltage source, through windings 49, 51 to ground, and thence into the negative terminal of that voltage source. This energization of the windings 49, 51 will close the contact pairs 52, 54 and open the contact pairs 53, 55; but this still leaves the brushes of the armature 11 short-circuited through contact pairs 52, 54 and hence the armature 11 will not move to alter the setting of capacitor 5. The foregoing is the condition of the apparatus when the frequency of the oscillator 1 coincides with the resonant frequency of the discriminator elements 16, 17.

If the frequency of the generator 1 is altered slightly so that its beat frequency with standard oscillator 103 differs from the resonant frequency of the elements 19, 21, 22, the current flowing through winding 42 of relay 43 alters and the latter no longer exerts a force exactly equal to that of the winding 44 on the movable contact 46. If the current drawn by reactance tube 33 increases as a result of the discrepancies between the frequency of oscillator 1 and the resonant frequency of the oscillators 16, 17, the movable contact 46 will be pulled downward into incidence upon contact 48. As a result of this the winding 51 will be short-circuited through contacts 46, 48 and 62 and the contact pair 54 will open while contact pair 55 closes. The lower brush of the armature 11 will thus be connected to one end terminal of the voltage source 59 through contacts 55 while the upper brush of armature 11 will remain connected through contact pair 52 and closed contact pair 63 to the mid-point of the voltage source 59. Half the voltage of the source 59 will thus be impressed on the armature 11 thereby causing it to slowly rotate in one direction. By properly poling the armature 11 and field winding 12, this direction of rotation can be made such as to move the capacitor 5 in the direction to bring the beat frequency of oscillator 1 back into coincidence with the resonant frequency of elements 19, 21, 22 of the discriminator.

If, in contrast to the foregoing, the current drawn by reactance tube 33 through winding 42 as a result of the discrepancy between the beat frequency of oscillator 1 and the elements 19, 21, 22 had decreased, the strength of winding 44 would have overcome the force exerted by winding 42 and movable contact 46 would move into incidence with contact 47 of relay 43. Had this happened, the winding 49 would have been short-circuited through contacts 46, 47 and 62 while winding 51 remained energized, and the contact pair 52 would have opened when contact pair 53 reclosed. The lower brush of motor 11 would then be connected through contact pairs 54 and 63 to the mid-point of voltage source 59 while the upper brush of armature 11 would be connected through contact pair 53 to the right-hand terminal of voltage source 59. The brushes of the armature 11 would accordingly be connected with the opposite polarity to that occurring when contact 46 moved into incidence with contact 48 as above described, and the capacitor 5 would be moved in the sense which would tend to bring the frequency of oscillator 1 back into coincidence with the beat resonant frequency of elements 19, 21, 22.

It will thus be evident that the relay system above described acts to correct the frequency of the oscillator 1 by the action of reactance tube 33 so long as winding 61 is traversed by sufficient current to close the contact pairs 62 and 63.

However, the amount of equivalent reactance which the tube 33 can reflect into the tank circuit 4, 5 is limited by certain factors so that the arrangement just described cannot be relied upon to furnish the necessary correction if the beat frequency of oscillator 1 departs too far from the resonant frequency of elements 19, 21, 22 of the discriminator. When such a wide departure occurs, however, the current through the winding 61 will increase and the contact pairs 62, 63, 64, 65 will then change from the condition shown in Fig. 1. The relay 43 then temporarily loses control of the motors 11, 12 and the limit switch 57 acquires such control.

It will be seen that, with the contact pair 64 closed, the common terminal of the windings 49, 51 is connected to the movable blade of the limit switch 57. As previously stated, this movable blade is in contact either through contact 56 with the positive terminal of voltage source B or through contact 58 with the ground. If the movable blade is in incidence with contact 56, the winding 49 is short-circuited through contact pairs 64 and 56 while winding 51 is energized from the positive terminal of voltage source B through ground. As a result, contact pairs 52, 53 are in the position shown in the drawing, while contact pair 54 is closed and contact pair 55 open. The lower brush of the armature 11 is therefore in contact through contact pairs 54 and 65 with the left-hand terminal of the voltage source 59 when the upper brush of armature 11 is in contact through contact pair 53 with the right-hand terminal of voltage source 59. Thus the full voltage of the source 59 is impressed on the armature 11 to rotate it with comparative rapidity and thereby alter the setting of capacitor 5 in the tank circuit of oscillator 1. If the direction of rotation of armature 11 is such as to move the beat frequency of the oscillator 1 toward coincidence with the resonant frequency of the elements 19, 21, 22 of the discriminator, the beat frequency of oscillator 1 will soon become close enough to such resonant frequency so that substantial current will cease flowing through winding 61 and return the relay system to the condition first described in which the relay 43 governs the motor 11, 12 in such a way as to slowly vary the beat frequency of oscillator 1 into coincidence with the resonance of elements 19, 21, 22.

On the other hand, if the direction of rotation of the armature 11 is such as to move the capacitor 5 to increase the discrepancy of beat frequency between oscillator 1 and the resonant frequency of the discriminator elements 19, 21, 22, the winding 61 will remain temporarily energized. However, the capacitor 1 will soon reach one of its extreme positions, and thereby move the limit switch 57 to contact with the other terminal 58. When this happens the winding 51 will be short-circuited and the winding 49 will be energized, thereby causing closure of the contact pair 54, opening of the contact pair 55, closure of the contact pair 52, and opening of the contact pair 53. This will reverse the polarity with which the brushes of armature 11 are connected to voltage source 59; the motor will begin to rotate in the opposite direction and thereby move the capacitor 5 to alter the frequency of oscillator 1 in the opposite sense to which it was being varied before the capacitor 5 reached its end position and thereby changed the position of limit switch 57. Varying the frequency of oscillator 1 in this opposite sense will necessarily soon bring its beat frequency into close coincidence with that of the resonant frequency of discriminator elements 19, 21, 22 at which time the "search relay" windings 61 will be reenergized to disconnect the winding 49, 51 from control of the limit switch 57 and put them under control of the relay 43. It has already been shown that once the motor 11, 12 is under control of relay 43 it moves the capacitor 5 in the right amount and direction to bring the beat frequency of oscillator 1 into consonance with the resonant frequency of discriminator elements 19, 21, 22.

It is thus evident that the relay system above described is capable of adjusting the beat frequency of the oscillator 1 to consonance with the resonant frequency of the discriminator elements 19, 21, 22 regardless of how much the beat frequency of the oscillator 1 may accidentally depart from the said consonance. While we have described this adjustment as carried out by mechanical adjustment of capacitor 5, this is only illustrative of any method of tuning known to those skilled in the art.

It will be further evident that the operating frequency of the oscillator 1 may be changed from a given value to any other desired value by manually adjusting the elements 16, 17, 19, 21, 22 of the discriminator so that they will be resonant at the new desired frequency. The relay system will then adjust the capacitor 5 until the beat frequency of oscillator 1 operates at the new frequency.

It will further be obvious that the standard frequency oscillator 103 mixer tube 102, limiter 111 and discriminator elements 16 through 25 may be located at a control point distant from the remaining elements of the above described system and that the only current channels between the control point and the remainder of the system needed to operate as above described is the one embodying capacitor 115, that embodying capacitor 101A and the one connecting resistor 29 with amplifier 30. Neither of these channels needs to carry anything except the small currents necessary to energize the control grids of amplifier tubes; hence they may comprise small conductors and cheap construction. It is also within the purview of our invention to substitute the channels containing capacitors 115 and 101A and the input lead to amplifier 30, a radio link comprising a radio transmitter, modulated by the currents herein transmitted through said channels, and a receiver located at the control point and adapted to reproduce such currents. The making of such radio link would be easily within the ability of men skilled in the art. Alternatively if it is not desired to adjust the frequency of standard oscillator 103, it need not be located at the control point in which case the wire or radio channel embodying capacitor 101A need not be run to the control point.

It will be evident that where the frequency of the standard oscillator 103 is not far different from the desired frequency for the oscillator 1 a small percentage departure of the latter from its desired frequency will make a much larger percentage variation of the beat frequency and that correspondingly the discriminator 16—28 and the relays which it controls will act with great sensitivity to correct for any departure of the frequency of oscillator 1 from the desired value.

The frequency of the oscillator 1 may be adjusted to a new value either by changing the frequency of the standard oscillator 103 to a suitable value to correspond with the same beat frequency with the new frequency for oscillator 1, or this change may be made with retaining the same standard oscillator 103 by changing the beat frequency for which the elements 16, 17, 19, 21 and 22 of the discriminator of Fig. 1 are tuned.

It may be noted that variation of capacitor 5 roughly adjust the frequency of oscillator 1, and fine adjustments are made by varying reactance tube 33. Where fine adjustments are not needed the elements 29 through 48 and 62 which employ the reactance tube 33 to finely adjust the frequency of oscillator 1 may in fact, be omitted. The relay control system for varying capacitor 5 is but an illustration of many that might affect its purpose.

While we have described certain specific embodiments of the principles of our invention to comply with the patent statutes, there are numerous other ways of applying these principles specifically which will be evident to those skilled in the art.

We claim as our invention:

1. In combination with a first oscillation generator, a tank circuit therefor having a variable reactance, a motor for varying said reactance, a second oscillation generator, a discriminator having a resonant circuit and having an output voltage which changes polarity when the frequency impressed on said discriminator of said tank circuit passes through the frequency of said resonant circuit, means for impressing the beat frequency of said first and second oscillation generator on said discriminator, a reactance tube controlled by said discriminator to compensate said variable reactance, a balanced relay adapted to cause energization of a second relay when the plate current of said reactance tube exceeds a predetermined value and to energize a third relay when the plate current of said reactance tube falls below said predetermined value, energization of said second relay causing rotation of said motor in one direction, means for causing energization of the third relay to rotate said motor in the opposite direction, a limit switch for said variable reactance connected through a fourth relay to cause rotation of said motor in one direction for one position of said limit switch and in the opposite direction for the other position of said limit switch only when said fourth relay is in one position, said limit switch being incapable of producing rotation of said motor when said fourth relay is in another position, and means for moving said fourth relay from said one position to said other position when the departure of said beat frequency from the frequency of said discriminator exceeds a predetermined value.

2. In combination with an oscillation generator having a tank circuit embodying an adjustable reactance, a motor for adjusting said reactance, a second oscillation generator, means for beating the frequency of said first oscillation generator and said second oscillation generator, means for impressing the beat frequency thus obtained upon a discriminator having a resonant circuit and having an output voltage which reverses polarity when said impressed voltage passes through the resonant frequency of said resonant circuit, relay means responsive to departure of said beat frequency from said resonant frequency for controlling said motor to make its direction of rotation dependent upon the polarity of the output voltage and said discriminator when said beat frequency departs from said resonant frequency by less than a predetermined amount, a limit switch for said variable reactor, said relay means making the direction of rotation of said motor dependent on the position of said limit switch when said departure is greater than said predetermined amount.

THEODORE P. KINN.
DAVID R. TASHJIAN.

REFERENCES CITED

The following references are of record in the file of this patent:

UNITED STATES PATENTS

| Number | Name | Date |
| --- | --- | --- |
| 1,780,669 | Bruckel | Nov. 4, 1930 |
| 2,044,749 | Usselman | June 16, 1936 |
| 2,151,127 | Logan | Mar. 21, 1939 |
| 2,197,485 | Schulze-Herringen | Apr. 16, 1940 |
| 2,375,133 | Polkinghorn | May 1, 1945 |